United States Patent [19]
Bender et al.

[11] Patent Number: 5,138,835
[45] Date of Patent: Aug. 18, 1992

[54] DIESEL ENGINE WITH AN EXHAUST-GAS FILTER

[75] Inventors: Franz Bender, Wendlingen; Dirk Naber, Stuttgart, both of Fed. Rep. of Germany

[73] Assignee: Mercedes-Benz AG, Fed. Rep. of Germany

[21] Appl. No.: 704,434

[22] Filed: May 23, 1991

[30] Foreign Application Priority Data

May 23, 1990 [DE] Fed. Rep. of Germany ....... 4016572

[51] Int. Cl.$^5$ .......................... F02B 3/02; F02M 25/06
[52] U.S. Cl. .......................................... 60/278; 60/288
[58] Field of Search .................................. 60/278, 288

[56] References Cited
U.S. PATENT DOCUMENTS 4,756,155  7/1988  Shinzawa .............................. 60/278

Primary Examiner—Douglas Hart
Attorney, Agent, or Firm—Evenson, Wands, Edwards, Lenahan & McKeown

[57] ABSTRACT

In an internal-combustion engine, in particular a diesel engine, with an exhaust-gas filter and an exhaust gas recirculation, the exhaust counter-pressure prevailing upstream of the exhaust-gas filter is used as one of a number of controlled variables for automatically controlling the exhaust gas recirculation. Since the exhaust-gas filter experiences flow resistance variations, particularly if it is a soot burn-off filter, which variations are independent of engine operation and consequently falsify the automatic control of the exhaust gas recirculation, the respective instantaneous exhaust-gas filter flow resistance must be measured as a correcting quantity and taken into account. A measuring device is fitted into a bypass line bridging the exhaust-gas filter and operates with a negligible bypass flow such that, above a predeterminable upper exhaust-gas filter differential pressure, it can lead past the exhaust-gas filter an increased bypass flow, which can, if appropriate, correspond to the entire exhaust flow.

6 Claims, 1 Drawing Sheet

DIESEL ENGINE WITH AN EXHAUST-GAS FILTER

BACKGROUND AND SUMMARY OF THE INVENTION

The present invention relates to an internal-combustion engine, and more particularly, to a diesel engine with an exhaust-gas filter arranged in the exhaust pipe in which an exhaust gas recirculating line having an exhaust gas recirculating control valve leads from the exhaust pipe to the intake pipe, with the exhaust gas recirculating control valve acted upon by a control signal for the control of a recirculated exhaust gas quantity.

German Pat. No. DE-OS 25 19 609 shows an internal-combustion engine measuring device arranged in the bypass pipe. This device determines the pressure of the exhaust gases in the sections of the exhaust pipe situated upstream and downstream of the exhaust gas filter as the differential pressure which, as the measuring signal, is guided to a control unit to initiate regeneration of the exhaust gas filter when a given differential pressure is reached. A disadvantage of the known measuring device is that it can be used only for initiating the regenerating of the exhaust gas filter.

In addition, a diesel internal-combustion engine is shown in German Pat. No. DE-OS 32 35 953 and has an exhaust gas filter in the exhaust pipe as well as a bypass pipe for the bypassing of exhaust gas at the exhaust gas filter, with the bypass line controlled by a bypass valve. In addition, this diesel internal-combustion engine also has an exhaust gas recirculating system with an exhaust gas recirculation valve. The bypass valve and the exhaust gas recirculating valve are controlled such that they are open in the partial-load operation and closed in the full-load operation. A control of the recirculated exhaust gas quantity as a function of the charge condition of the exhaust gas filter is not provided.

It is an object of the present invention to further improve a measuring device such that, on one hand, in the operating ranges with exhaust gas recirculation, an exhaust gas recirculation rate adapted to the operating conditions of the internal-combustion engine as precisely as possible can be maintained, and, on the other hand, an operation of the internal-combustion engine is still reliably ensured even when the exhaust gas filter is completely or predominantly clogged.

This object has been achieved in accordance with the present invention by the provision of an exhaust gas recirculating line having an exhaust gas recirculating line with an exhaust gas recirculating control valve which leads from the exhaust pipe to the intake pipe. The exhaust gas recirculating control valve, from the control unit, is acted upon by a control signal for the control of a recirculated exhaust gas quantity which is a function of the differential pressure, with the control signal derived from the measuring signal of the control piston. Starting from a given differential pressure, the control piston opens up a bypass duct so that a partial flow from the section of the exhaust pipe situated upstream of the exhaust gas filter can flow through the bypass line.

The measuring device in accordance with the invention is constructed such that it operates as pressure measuring device until an adjustable upper differential pressure is reached. For this function, only an extremely small quantity of exhaust gas may flow around the piston of this measuring device which is subjected to the differential pressure. This flowing-around is a function of the installation of an exhaust gas turbocharger upstream or downstream of the exhaust gas filter in the exhaust pipe. However, the exhaust gas quantity flowing around the piston is so small that it is negligible with respect to the function of the exhaust gas filter and to the purification of the exhaust gases from carbon particles that can be achieved thereby. The position of the piston subjected to the differential pressure, which is proportional to the respective differential pressure, inside the housing can be detected by a displacement meter via a rod connected directly to the piston. The differential pressure thus detected is used as, inter alia, a controlled variable for automatically controlling the exhaust mass flow to be recirculated for combustion. Further controlled variables dependent on engine operation may also be used, as superimposed variables, for automatically controlling the exhaust mass flow to be recirculated.

In the event of an unwanted clogging of the exhaust-gas filter and also in the event of an undesirably temporarily high pressure loss in the exhaust-gas filter, the present invention provides that the exhaust can flow automatically past the exhaust-gas filter via a bypass.

The measuring device according to the present invention is thus set up such that, when a predeterminable pressure loss at the exhaust-gas filter is exceeded, the exhaust bypass flow, which is flowing in the measuring instrument determining the pressure drop in the exhaust-gas filter and in itself is quantitatively negligible, increases abruptly, to be precise to such an extent that virtually the entire exhaust can flow temporarily in the exhaust-gas bypass filter. If the measuring instrument has assumed such a function, it has in this state lost its function as a pressure-difference measuring device. The displacement meter connected to the piston of the measuring device subjected to the differential pressure detects the change in function of the measuring instrument into an exhaust bypass line and can in such a case reduce or even completely prevent the exhaust gas recirculation.

With an increased flow resistance of, in particular, a soot burn-off filter of a diesel engine, in many cases such a reduction or prevention of the exhaust gas recirculation is desired, in order to prevent already in the state of an increasing flow resistance any further increase by reducing or preventing the quantity of exhaust gas recirculated. An exhaust gas recirculation mainly has the effect of reducing the oxygen content in the exhaust, whereby a burning-off of soot in the exhaust-gas filter is made additionally more difficult, with the consequence that the burn-off behavior becomes worse and worse due to the lower oxygen content, with the consequence that the filter may block entirely if unfavorable operating conditions persist.

BRIEF DESCRIPTION OF THE DRAWINGS

These and further objects, features and advantages of the present invention will become more apparent from the following detailed description of a presently preferred embodiment of the invention when taken in conjunction with the accompanying drawings wherein.

DETAILED DESCRIPTION OF THE DRAWINGS

Figure 1:
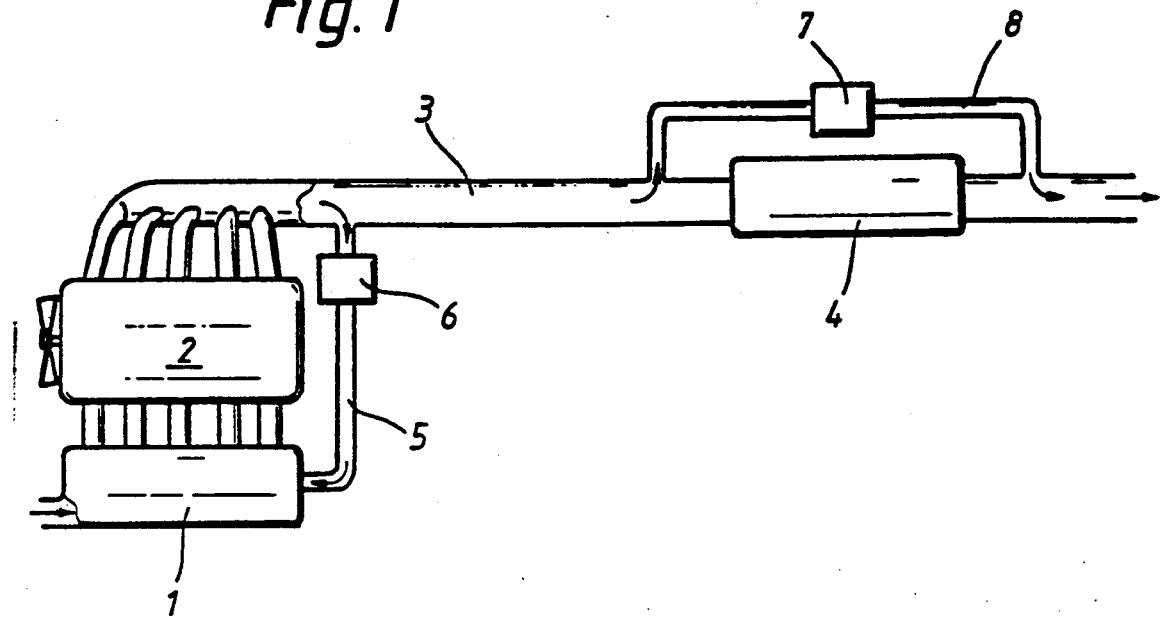
FIG. 1 is schematic showing a diesel engine with a soot burn-off filter in the exhaust pipe.

Air taken in from a diesel engine 2, via an air filter 1, leaves the engine 2 as exhaust via the exhaust pipe 3. In the exhaust pipe 3, before entering the atmosphere, the exhaust passes an exhaust-gas filter 4, configured as a soot burn-off filter.

To improve exhaust emissions, an exhaust gas recirculation via a line 5 can be used. Exhaust, which is controlled by an exhaust gas recirculation valve 6, flows via this line 5 from the region upstream of the exhaust-gas filter 4 via the air filter housing 1 back for engine combustion.

The quantity of exhaust gas recirculated is controlled, inter alia, by a delivery gradient between the intake line and the exhaust pipe 3. This delivery gradient is selected to reflect certain engine operating conditions. However, the operating conditions to be reproduced by the pressure gradient can only be actually representative if the pressure drop in the exhaust-gas filter 4 is either constant or varies exclusively in dependence on engine operation.

Exhaust-gas filter flow resistance variations which are independent of engine operation result in a falsification of the quantity of exhaust gas recirculated which is controlled, inter alia, by the delivery gradient. Since such flow resistance variations of the exhaust-gas filter which are independent of engine operation are unavoidable, in particular in the case of a discontinuously burning-off soot burn-off filter, the respective delivery gradient must be corrected appropriately, incorporating in the correction the respective actual pressure loss in the exhaust-gas filter, deviating from the corresponding set value.

For this purpose, the pressure difference between upstream and downstream of the exhaust-gas filter 4 is obtained by a measuring device 7. The pressure difference determined in this measuring device 7 is supplied together with other controlled variables to the exhaust gas recirculation valve 6 for its actuation. The measuring device 7 is located in a bypass line 8 of the exhaust-gas filter 4.

Figure 2:
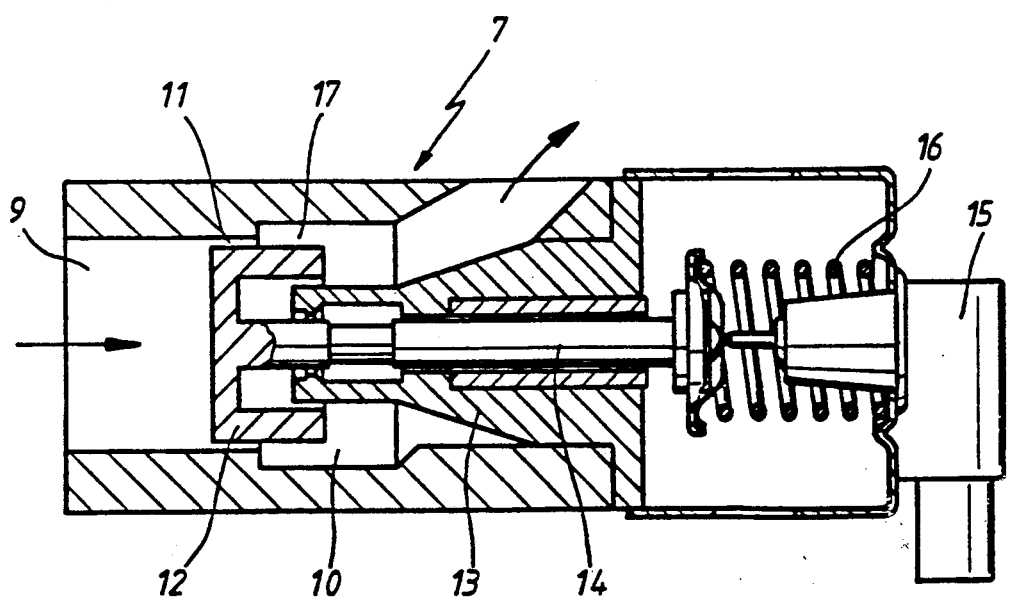
FIG. 2 is a sectional view through a measuring device in accordance with the present invention for determining the pressure drop within a soot burn-off filter of the type shown in FIG. 1.

The measuring device 7 of the present invention is shown in detail in FIG. 2. The space 9 is connected with the exhaust pipe 3 upstream of the exhaust-gas filter 4, and the space 10 of the measuring device 7 reproduces the state downstream of the exhaust-gas filter 4. The spaces 9 and 10 are separated from each other apart from a small annular gap 11 over a longitudinally displaceable piston 12. The piston 12 is guided in a central bearing 13 by a piston rod 14 which is fixedly connected to the piston 12. The piston rod 14 is connected to a displacement meter 15. The pressure drop at the exhaust-gas filter 4 can be measured at the displacement meter 15 and fed together with other controlled variables to the servomotor of the known exhaust gas recirculation valve 6.

The annular gap 11 is sized to be small enough in relation to its cross-section that the bypass exhaust flow flowing over it is totally negligible in comparison with the main exhaust flow flowing through the exhaust-gas filter 4. Due to the negligibility of the exhaust bypass flow flowing through the measuring device 7, there is thus the same pressure difference between the spaces 9 and 10 of the measuring device 7 as between inlet and outlet of the exhaust-gas filter. Owing to its higher value than the pressure downstream of the exhaust-gas filter 4, the pressure prevailing in the space 9 upstream of the exhaust-gas filter exerts a force urging the piston 12 in the direction of the space 10. Due to this excess of force, the piston 12 is displaced against the pressure of a spring 16 in the direction of the displacement meter 15. It is possible for this displacement path to be recorded by the displacement meter 15 and to be output as a pressure variation or as pressure drop of the exhaust-gas filter 4.

The measuring device 7 described above delivers the necessary signal to be able to compensate for the effects of the variable pressure drop over the exhaust-gas filter in the engine operation and the exhaust measures. Apart from the pressure drop at the exhaust-gas filter 4, the delivery gradient controlling the exhaust gas recirculation depends only on the pressure build-up of the remaining exhaust system and the intake pipe pressure upstream of the engine combustion chambers, which may be generated in a specific manner, for example by throttling. In contrast to the pressure drop at the exhaust-gas filter, however, these pressures are dependent only on the operating behavior of the engine and consequently are predictable if the latter is known. Consequently, knowledge of the pressure drop at the exhaust-gas filter together with knowledge of the engine operating point is sufficient to predict the appropriate pressure gradient for exhaust gas recirculation.

If a predeterminable pressure gradient is exceeded at the exhaust-gas filter 4, the measuring device 7 transforms into an effective bypass line. In an extreme case, as for example in the event of a complete blocking of the exhaust-gas filter 4, the entire exhaust flow can then flow past the exhaust-gas filter 4 through the measuring device 7 in the bypass. The bypass function of the measuring device 7 only comes about by the annular gap 11 widening into an exhaust flow bypass ring channel 17 if the predetermined upper pressure gradient value at the exhaust-gas filter 4 is exceeded. This widening takes place as a result of the piston 12 being displaced under the increased pressure within the measuring device 7 into a region in which the housing enclosing the piston 12 forms the enlarged bypass ring channel 17.

The exhaust gas recirculation can be controlled such that, in the event of a genuine bypass function of the measuring device 7, which is detected by the displacement meter 15, exhaust gas recirculation is completely prevented. With heavy charging of a soot burn-off exhaust-gas filter, exhaust gas recirculation is disadvantageous due to the resultant reduction in the oxygen content in the exhaust, in that the risk of the soot burn-off filter being sooted up even to such a degree as to block it is increased further. As soon as the engine again provides for favorable exhaust temperatures and oxygen contents, due to reaching a different operating state to result in a regeneration of the soot burn-off filter, the measuring device 7 according to the present invention then reverts to its measuring function.

Due to condensation, a freezing of the soot burn-off filter 4 at low temperatures cannot be completely ruled out in some cases. Without a bypass, this freezing leads to the engine not starting. This risk is eliminated by the measuring device 7 according to the present invention because, in the event of an excessive pressure loss in the exhaust-gas filter 4, irrespective of the cause of this pressure loss, the measuring instrument automatically switches over from its measuring function to its bypassing function. As soon as the soot burn-off filter can operate normally again due to the heat generated by the engine in such a case, the measuring instrument 7 resumes its measuring function fully automatically.

By appropriately sizing the cross-section of the annular gap 11 for the measuring function, the measuring device 7 can be used to direct a certain percentage of the exhaust past the exhaust-gas filter 4 in a specific manner in order, for example, to set specifically an efficiency of the particle separation in this manner. This may be necessary in some cases if, with an otherwise advantageous material of the exhaust-gas filter 4, only extremely high degrees of separation can be produced. Such high degrees of separation bring about, however, a constant high particle charging which, due to consequent high thermal loads caused by regenerations can result in the service life of the soot burn-off filter being adversely affected. By a specific setting of a bypass flow, the charging and consequently the loading caused by regenerations, can be reduced and the service life of the complete system increased as a result.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A diesel internal-combustion engine, comprising an exhaust pipe, an exhaust gas filter arranged in the exhaust pipe, a bypass line branching off from the exhaust pipe upstream of the exhaust gas filter and connected with the exhaust pipe downstream of the exhaust gas filter, a measuring device provided in the bypass line having a control piston surrounded by a housing, which control piston having respective end faces acted upon by exhaust gas upstream of the exhaust-gas filter and acted upon by the exhaust gas downstream of the exhaust-gas filter, said control piston being displaceable in a path by differential pressure from both exhaust gas pressures against the effect of a restoring force in the housing of the measuring device, the displacement path being used as a measuring signal for a control unit, wherein an exhaust gas recirculating line having an exhaust gas recirculating control valve leads from the exhaust pipe to an intake pipe of the engine, the exhaust gas recirculating control valve, is acted upon by a control signal, from the control unit for the control of a recirculated exhaust gas quantity which is a function of differential pressure, the control signal being derived from the measuring signal of the control piston, and starting from a given differential pressure, the control piston opens up a bypass duct so that a partial flow from the section of the exhaust pipe situated upstream of the exhaust-gas filter can flow through the bypass line.

2. The diesel internal-combustion engine according to claim 1, wherein a first space, which is acted upon by the exhaust gas pressure upstream of the exhaust-gas filter, and a second space, which is acted upon by the exhaust gas pressure downstream of the exhaust-gas filter and which has the bypass duct controlled by the control piston, are separated from the control piston in the housing of the measuring device.

3. The diesel internal-combustion engine according to claim 2, wherein the bypass duct is a ring duct surrounding the control piston by a widening of the second space.

4. The diesel internal-combustion engine according to claim 3, wherein a hub-shaped bearing for the guiding of a piston rod connected with the control piston projects into the second space.

5. The diesel internal-combustion engine according to claim 4, wherein the control piston is arranged in the first space and encloses an annular gap.

6. The diesel internal-combustion engine according to claim 2, wherein the control piston, via a piston rod associated therewith, is connected directly with a displacement meter which proportionally detects the differential pressure at the exhaust-gas filter.

* * * * *